T. S. C. Lowe.
Manuf. of Ice.
No 63,413. Patented Apl 2, 1867.
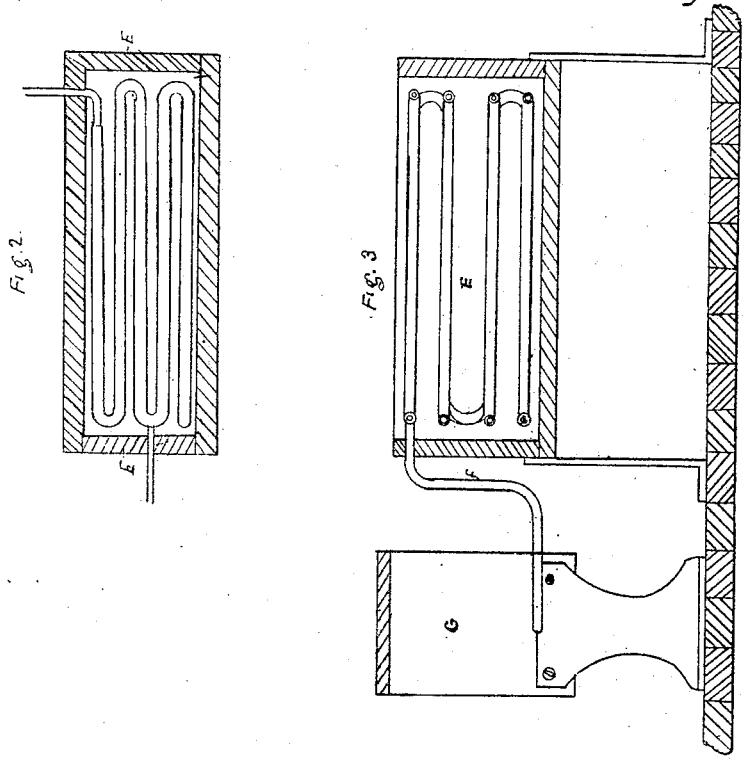
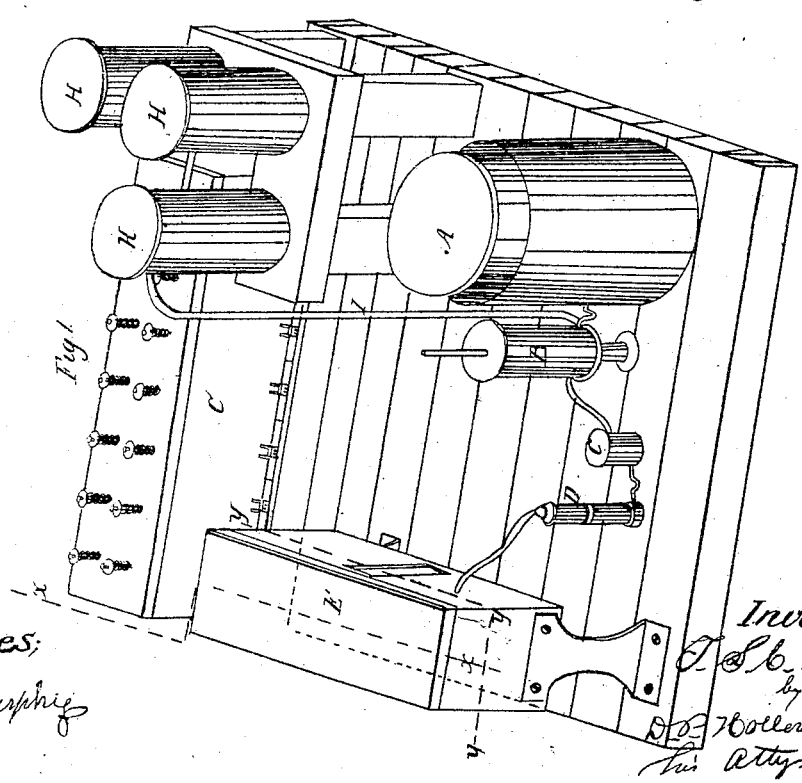
Witnesses:
O. Clarm
L. A. Murphie
Inventor:
T. S. C. Lowe
by
D. C. Holloway & Co
his Attys.

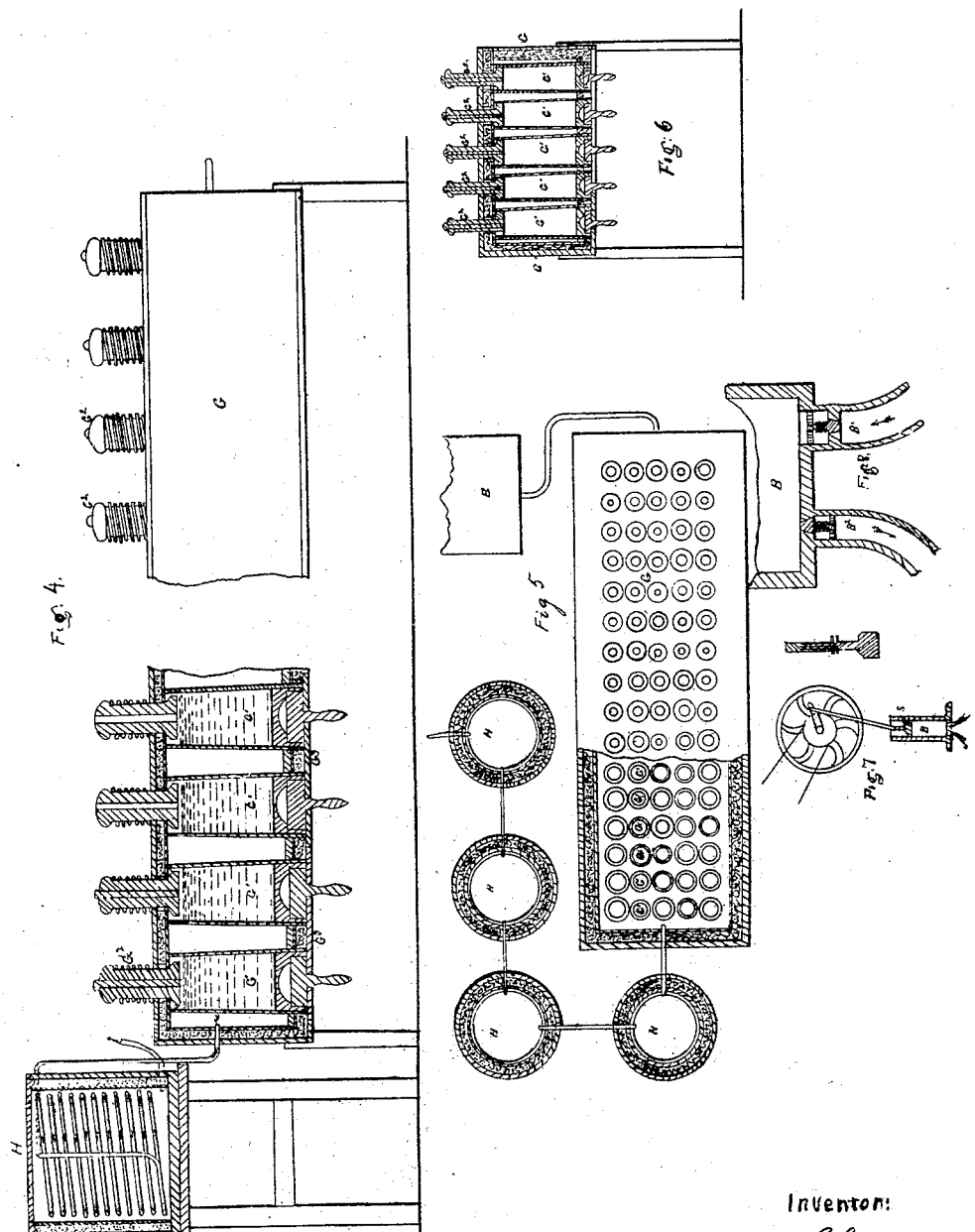

United States Patent Office.

THADDEUS S. C. LOWE, OF NEW YORK, N. Y.

*Letters Patent No. 63,413, dated April 2, 1867.*

---

IMPROVED MODE OF MANUFACTURING ICE.

---

*The Schedule referred to in these Letters Patent and making part of the same.*

---

TO ALL WHOM IT MAY CONCERN:

Be it known that I, THADDEUS S. C. LOWE, of the city of New York, county of New York, and State of New York, have invented a new and useful Process for Manufacturing Ice, and for other refrigerating purposes; and I do hereby declare the following to be a full and exact description of the same.

It is well known to men of science that certain bodies, which at ordinary temperatures and at the atmospheric pressure, can exist in the state of gas only, when subjected to sufficient mechanical pressure, are converted into the liquid state, evolving their latent heat. When these liquids are relieved from this pressure they return to the state of gas, and, in so doing, absorb heat from surrounding objects and rendering it latent; or, in other words, surrounding objects will be cooled thereby. Certain gaseous bodies, such as the atmospheric air, oxygen and hydrogen, do not change their state as above. Carbonic acid, sulphurous acid, nitrous oxide, and some hydrocarbon gases are examples of bodies which ordinarily exist in the gaseous state, and which, by mechanical compression, are converted into liquid state, as above stated, and it is such that I employ in my process, preferring, however, carbonic acid.

The nature of my process consists, first, in compressing mechanically carbonic acid gas, or other equivalent gaseous substances, as above set forth, into a liquid state, then bringing said liquid into contact or vicinity to water or other material to be refrigerated, and then relieving the pressure so that the carbonic acid or equivalent material may return to its gaseous state, then collecting and returning the material in its gaseous state to the pump or compressing apparatus, to be again recompressed and re-used successively as before. The operation is continued in this manner, using the same material successively.

The latent heat evolved during the process of mechanical compression should be removed by a running stream of water, or by a blast of cool air or other equivalent means, applied to the compressing pump or tubes, reservoir, or chamber proceeding from or connected with a compressing pump. The water to be frozen or the material to be cooled should be brought into intimate contact with the tube or vessel containing the carbonic acid or equivalent material while vaporizing or passing from the liquid to the gaseous state.

Among the refrigerating purposes to which my process is applicable, besides the freezing of water for the manufacture of ice and the cooling of air for disinfecting or ventilation, or purification of ships, hospitals, and other apartments, the preservation of meat, vegetables, and fruits, the manufacture of frozen beverages and cream, cooling-packing.

A convenient apparatus for carrying out my process so far as relates to freezing water is shown in the annexed drawing, in which—

Figure 1 is a perspective view of the apparatus.

Figure 2, a horizontal section on the line of $y\,y$, fig. 1.

Figure 3 is a vertical section on the line $x\,x$, fig. 1.

Figure 4 is a vertical longitudinal section, partly in elevation, on line $z\,z$, fig. 5.

Figure 5 is a vertical transverse section of the expansion chamber.

Figure 6 is a plane and horizontal section in part of the same.

Figure 7 is an elevation of the condensing pump, partly in section.

Figure 8 is a vertical central section of the same.

The carbonic acid or other equivalent gas having been generated by any of the known processes, and accumulated for convenience in a gasometer, A, is drawn therefrom by the pump B, through a pipe in which is placed a drip for the escape of accumulated water. In this induction pipe is a valve, $B^1$, opening inward, held in place by a spring, while a similar valve, $B^2$, opening outwards, permits the escape of the gas under the action of the pump. The plunger $B^3$ is open above, and on it should be poured a stream of water, which, overflowing, fills the tub in which the pump is immersed. The pump is driven by any ordinary machinery. The compression of the gas evolves a large amount of heat, and it is important to carry this heat off so as to facilitate the passage of the gas to the liquid state. To effect this the eduction pipe is formed in a coil and placed within a tub or receptacle supplied with a running stream of water through it. I prefer to introduce the cooling water so that it shall first come into contact with that part of the coil furthest from the compressing pump and escape at the point nearest to the compressing pump. After the pipe has passed through the cooler another trap is placed in it for withdrawing any water that may be mingled with it. The gas is thus passed through the dryer D, a metallic cylinder, filled with chloride of calcium or other equivalent chemical absorbent of water. It is important that the gas should be thoroughly dried, for any water mixed with it would soon be frozen and stop the pipes. It is then led into the coil in the receiver E, where the requisite pressure to convert the gas to a liquid state is maintained, say, for carbonic acid gas, about forty atmospheres. The gas slowly condenses into a liquid, which forms in the bottom of the coil. The parts being properly constructed this liquid may be retained under pressure indefinitely. When designed to be used it is drawn through the pipe F into the vaporization chamber G. I recommend the use of two pipes or a branched pipe, one part extending into the upper part of the receiver for drawing off the compressed gas, the other extending into the lower part of the coil for drawing off the liquid. The liquid should be passed through a gauge having one six hundred and fiftieth part of the capacity of the expansion chamber. This gauge, being first charged, may be discharged into the expansion chamber with safety and without waste. To make the intense cold generated in the expansion chamber available to as great an extent as possible I construct its casing double throughout, and fill the intermediate space with compressed wool. If the object be to manufacture ice I expose the water directly to the action of the cold by placing in the vaporization chamber sets of copper or other cylinders, in immediate contact with which the freshly-vaporized gas circulates, absorbing caloric from the water. These cylinders are made of sheet copper, increasing in diameter from top to bottom. They are closed below by an elastic plug, $G^1$, made of India rubber, so as to permit the expansion of the ice downward, thus preventing the rupture of the cylinders. Against these plugs a falling door, $G^3$, closes, holding them in place. The water is admitted through a small opening in the top of the cylinders. A rod, $G^2$, is also inserted through the top, by shrinking on which the block of ice may be started from the cylinder. When the gas in the freezing chamber has been heated by the caloric from the water it should be passed in a tube through one or more tanks, through which water used in replenishing the ice cylinders constantly passes before entering the ice chambers, and thus water will be greatly reduced in temperature. The gas thus becomes gradually warm by its passage through these tanks. The tanks communicate with one another by open pipes. After leaving the tanks the gas is conveyed into the compressing pump, as at first, or intermediately with the gasometer. The form and internal arrangements of the part respectively may be varied almost indefinitely by preserving the essential features of a condensing pump, a receiver, and an evaporization chamber, in which the water or material to be cooled is brought into close proximity to the freshly vaporized carbonic acid or equivalent material.

What I claim herein as my invention, and desire to secure by Letters Patent, is—

1. Compressing carbonic acid, or other equivalent gaseous body, into a liquid by a pump, and then permitting it to expand in a close chamber in contact with the exterior surface of the vessels or pipes containing the water or other substance to be refrigerated.

2. Compressing carbonic acid, or other equivalent gaseous body, into a liquid, by a pump, and then permitting it to expand in a close chamber in contact with the exterior surface of the vessels or pipes containing the water or other substance to be refrigerated, and then returning the gas to the condensing pump to be recompressed and re-used.

3. Compressing carbonic acid, or other equivalent gaseous body, by a pump having sufficient power to convert it into a liquid, removing the heat evolved by compression by exposing the pipe containing the compressed gas to the action of cold currents of water or air in contact with the surface thereof, and then permitting it to expand in a close chamber in contact with the exterior surface of the vessels or pipes containing the substance to be refrigerated.

4. Compressing carbonic acid, or other equivalent gaseous body, by a pump having sufficient power to convert it into a liquid, and removing any watery vapor or moisture from the compressed gas by passing it through chloride of calcium or equivalent absorbent.

5. Introducing the cold current of water or air to the cooling coil at the point most distant from the pump, and causing it to flow along the pipe toward the pump and escape from the point nearest the compressing pump.

T. S. C. LOWE.

Witnesses:
JOHN S. HOLLINGSHEAD,
WM. J. FAHERTY.